(12) United States Patent
Hernandez

(10) Patent No.: US 11,384,851 B2
(45) Date of Patent: Jul. 12, 2022

(54) CARTRIDGE ASSEMBLY FOR DIVERTING FLOW

(71) Applicant: Hector Hernandez, Santa Clarita, CA (US)

(72) Inventor: Hector Hernandez, Santa Clarita, CA (US)

( * ) Notice: Subject to any disclaimer, the term of this patent is extended or adjusted under 35 U.S.C. 154(b) by 441 days.

(21) Appl. No.: 16/595,529

(22) Filed: Oct. 8, 2019

(65) Prior Publication Data

US 2021/0102359 A1    Apr. 8, 2021

(51) Int. Cl.
*F16K 11/074* (2006.01)
*F16K 11/00* (2006.01)
*E03B 1/04* (2006.01)

(52) U.S. Cl.
CPC ............ *F16K 11/074* (2013.01); *E03B 1/048* (2013.01); *F16K 11/0743* (2013.01); *F16K 19/006* (2013.01)

(58) Field of Classification Search
CPC .. F16K 11/0743; F16K 19/006; F16K 11/074; F16K 11/0746; F16K 3/085; E03B 1/048; E03B 7/045
See application file for complete search history.

(56) References Cited

U.S. PATENT DOCUMENTS

| | | |
|---|---|---|
| 3,207,181 A | 9/1965 | Willis |
| 3,331,396 A | 7/1967 | Willis |
| 3,385,321 A | 5/1968 | Ehrens |
| 3,780,758 A | 12/1973 | DeVries |
| 3,810,602 A | 5/1974 | Parkinson |
| 4,105,043 A | 8/1978 | Nicolayczik |
| 4,205,822 A | 6/1980 | Bernat |
| 4,256,163 A | 3/1981 | Orszullok |
| 4,331,176 A | 5/1982 | Parkison |
| 4,360,040 A | 11/1982 | Cove |
| 4,453,567 A | 6/1984 | MacDonald |
| 4,651,770 A | 3/1987 | Denham |
| 4,793,375 A | 12/1988 | Marty |
| 4,821,765 A | 4/1989 | Iqbal |
| 4,823,832 A | 4/1989 | Rodstein |
| 4,887,793 A | 12/1989 | Hernandez |
| 4,924,903 A | 5/1990 | Orlandi |
| 4,944,330 A | 7/1990 | Sakakibara |
| 5,042,529 A | 8/1991 | Yeh |
| 5,107,884 A | 4/1992 | Orlandi |
| 6,073,647 A | 6/2000 | Cook |
| 6,202,695 B1 | 3/2001 | Wu |
| 6,575,196 B1 | 6/2003 | Creswell |
| 7,114,515 B2 | 10/2006 | Sponheimer |
| 8,297,305 B2 | 10/2012 | Ritter |

(Continued)

FOREIGN PATENT DOCUMENTS

CN    107795713 A  *  3/2018

*Primary Examiner* — Atif H Chaudry

(57) ABSTRACT

The present invention provides a cartridge assembly having a cartridge shell. The cartridge assembly permits flow from a flow source to be regulated by the cartridge assembly to flow along a first flow path or along a second flow path. Flow along the first flow path enters through a first end of the cartridge shell and exits through at least one opening in the cartridge shell. Flow along the second flow path enters through the first end of the cartridge shell and is diverted to exit through the first end of the cartridge shell.

2 Claims, 10 Drawing Sheets

(56) References Cited

U.S. PATENT DOCUMENTS

| | | |
|---|---|---|
| 9,091,045 B2 | 7/2015 | Korb |
| 9,587,382 B2 | 3/2017 | Korb |
| 10,385,978 B2 | 8/2019 | Hernandez |
| 2004/0099319 A1* | 5/2004 | Monti ................. B67C 3/28 137/625.46 |
| 2005/0151106 A1 | 7/2005 | He |
| 2012/0273075 A1 | 11/2012 | Pitsch |
| 2014/0102574 A1* | 4/2014 | Wang ................ F16K 11/074 4/675 |

* cited by examiner

CARTRIDGE ASSEMBLY FOR DIVERTING FLOW

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

The average modern home uses a water heater to supply hot water through the various faucets in the home. Unfortunately, the farther a faucet is from the water heater, the longer it takes hot water to work its way from the heater to the faucet. This is especially true in the morning when the pipeline is filled with once hot water that has cooled overnight. When hot water is desired in the morning, a common practice in many households is to open the hot water handle and flush out the cooled water. The volume of water flushed out by this practice may range from half a gallon to more than two gallons, depending on the temperature setting of the water heater, ambient temperature, pipe diameter, and length of pipe between the heater and the faucet. This common morning practice results in a substantial loss of clean, potable water. In 2018, there were 128 million households in the United States. If each household had flushed one gallon of cooled water every morning that year, the loss of clean, drinkable water would have been 47 billion gallons, enough water to supply the needs of 400,000 average-sized households for one year.

There are currently some solutions that minimize, if not eliminate, the need to flush clean, potable water down the drain. A demand-type water heater is one solution. This device can be installed near the area of use and heats water through a heating element operated by electricity or gas, providing hot water almost immediately. But there are drawbacks. Because of their low flow rate, more than one device would typically be needed to service a home. And while kitchen sinks generally have one or more electrical outlets below the sink, allowing a demand-type water heater to be installed out of sight, bathroom sinks typically do not. The effort to install electrical outlets or a separate gas line may discourage individuals from installing demand-type water heaters. Other barriers which may discourage installation are the initial cost of the system and the additional operating/energy consumption costs.

Another solution is a water heater recirculating system, which recirculates cooled water in a hot water pipeline back to the water heater to make hot water continuously available. This solution also requires electricity (unless the system is gravity fed) but does not require that the system be installed near the area of use. As with the demand-type water heater, the initial cost and the additional operating/energy consumption costs are barriers which may discourage the average individual from installing a recirculating system.

While still another solution could be to educate the public and encourage that cooled water not be flushed but, instead, captured, temporarily stored, and put to later beneficial use, adding this task to a household's daily morning activities would likely be a burden for most, especially families hurrying to prepare for work or get their children ready for school.

What is needed is a faucet having a cartridge assembly that will allow cooled water in a hot water pipeline to be regulated to flow along one flow path and hot water, once available, to be regulated to flow along another flow path. The cooled water could be directed to flow into a container placed under the sink, where the water would be captured and stored for later use. The hot water could be directed to flow out of the faucet spout for immediate use. The faucet would not require electrical outlet installations, ongoing operating/energy consumption costs, or much user effort.

BRIEF SUMMARY OF THE INVENTION

The present invention provides a cartridge assembly having a cartridge shell. The cartridge assembly permits flow from a flow source to be regulated by the cartridge assembly to flow along a first flow path or along a second flow path. Flow along the first flow path enters the cartridge shell through a first end and exits through at least one opening in the cartridge shell. Flow along the second flow path enters the cartridge shell through the first end and is diverted to exit through the first end.

In an exemplary embodiment, a cartridge assembly includes a cartridge shell. The cartridge shell includes a first end and a second end. The cartridge shell includes one opening between the first end and the second end. The cartridge assembly includes a stem. The stem is operable to be at least partially disposed within the cartridge shell. The cartridge assembly includes a moveable disk. The moveable disk is operable to be disposed within the cartridge shell. The moveable disk includes one opening. The moveable disk also includes a cavity. The cartridge assembly includes a fixed disk. The fixed disk is operable to be disposed within the cartridge shell. The fixed disk includes two openings, a first opening and a second opening.

In an exemplary embodiment, the moveable disk abuts the fixed disk such that the cavity in the moveable disk abuts the fixed disk. The stem is operable to be connected to the moveable disk so that rotation of the stem causes rotation of the moveable disk relative to the fixed disk. Flow entering the cartridge assembly flows either through the first end in the cartridge shell, through the first opening in the fixed disk, through the opening in the moveable disk, and exits through the opening in the cartridge shell or flows through the first end in the cartridge shell, through the first opening in the fixed disk, into the cavity in the moveable disk where the flow is diverted through the second opening in the fixed disk, and exits through the first end in the cartridge shell.

In an exemplary embodiment, the moveable disk and the fixed disk are configured such that movement of the moveable disk relative to the fixed disk creates a first zone of control and a second zone of control. Under the first zone of control, flow from a flow source is regulated through a range of stem rotation from a completely-closed position, which does not permit any flow to exit through the opening in the cartridge shell, to a completely-open position at a counter-clockwise rotation of the stem of ninety degrees (90°), which permits a maximum flow to exit through the opening in the cartridge shell. Under the second zone of control, the flow is regulated through a range of stem rotation from a completely-closed position, which does not permit any flow to exit through the first end of the cartridge shell, to a completely-open position at a clockwise rotation of the stem of ninety degrees (90°), which permits a maximum flow to exit through the first end of the cartridge shell. Under the first zone of control, the flow is regulated by the cartridge assembly through the first end of the cartridge shell, through the first opening in the fixed disk, through the opening in the moveable disk, and through the opening in the cartridge shell. Under the second zone of control, the flow is regulated by the cartridge assembly through the first end of the cartridge shell, through the first opening in the fixed disk, into the cavity in the moveable disk where the flow is diverted through the second opening in the fixed disk, and through the first end of the cartridge shell.

BRIEF DESCRIPTION OF THE SEVERAL VIEWS OF THE DRAWINGS

-FIG. 5A is a top plan view, FIG. 5B is a bottom plan view, FIG. 5C is a front elevational view, and FIG. 5D is a side elevational view;

-FIG. 6A is a top plan view, FIG. 6B is a bottom plan view, FIG. 6C is a front elevational view, and FIG. 6D is a side elevational view;

-FIG. 7A is a top plan view, FIG. 7B is a bottom plan view, FIG. 7C is a front elevational view, and FIG. 7D is a side elevational view;

-FIG. 8A is a view of the moveable disk and the fixed disk in a completely-closed position, FIG. 8B is a view of the moveable disk and the fixed disk in a completely-open position at ninety degrees (90°) clockwise rotation of the moveable disk relative to the fixed disk; and FIG. 8C is a view of the moveable disk and the fixed disk in a completely-open position at ninety degrees (90°) counterclockwise rotation of the moveable disk relative to the fixed disk.

DETAILED DESCRIPTION OF THE INVENTION

Figure 1:
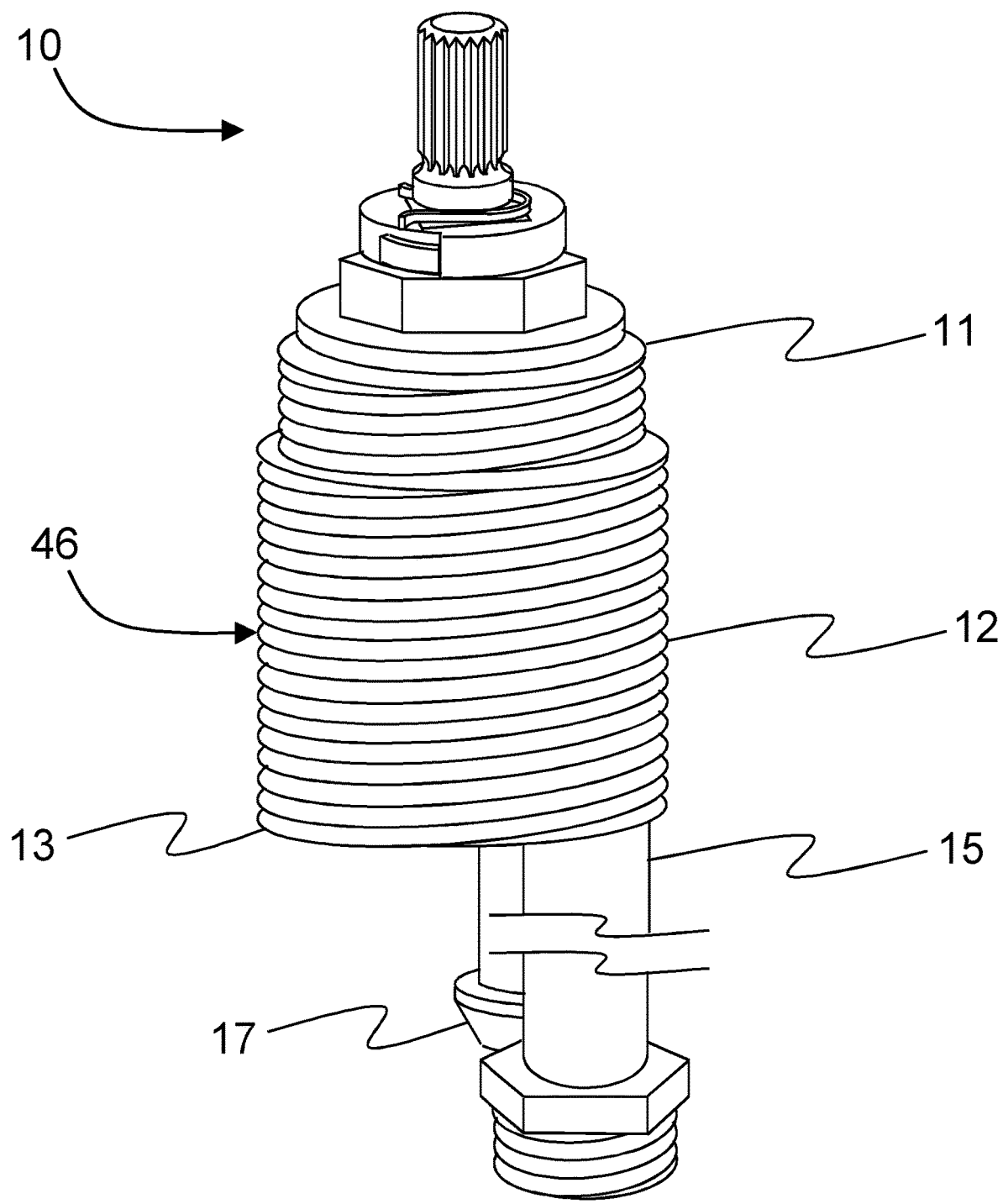
FIG. 1 is a perspective view of a cartridge assembly installed in a valve body according to an exemplary embodiment.
Figure 2:
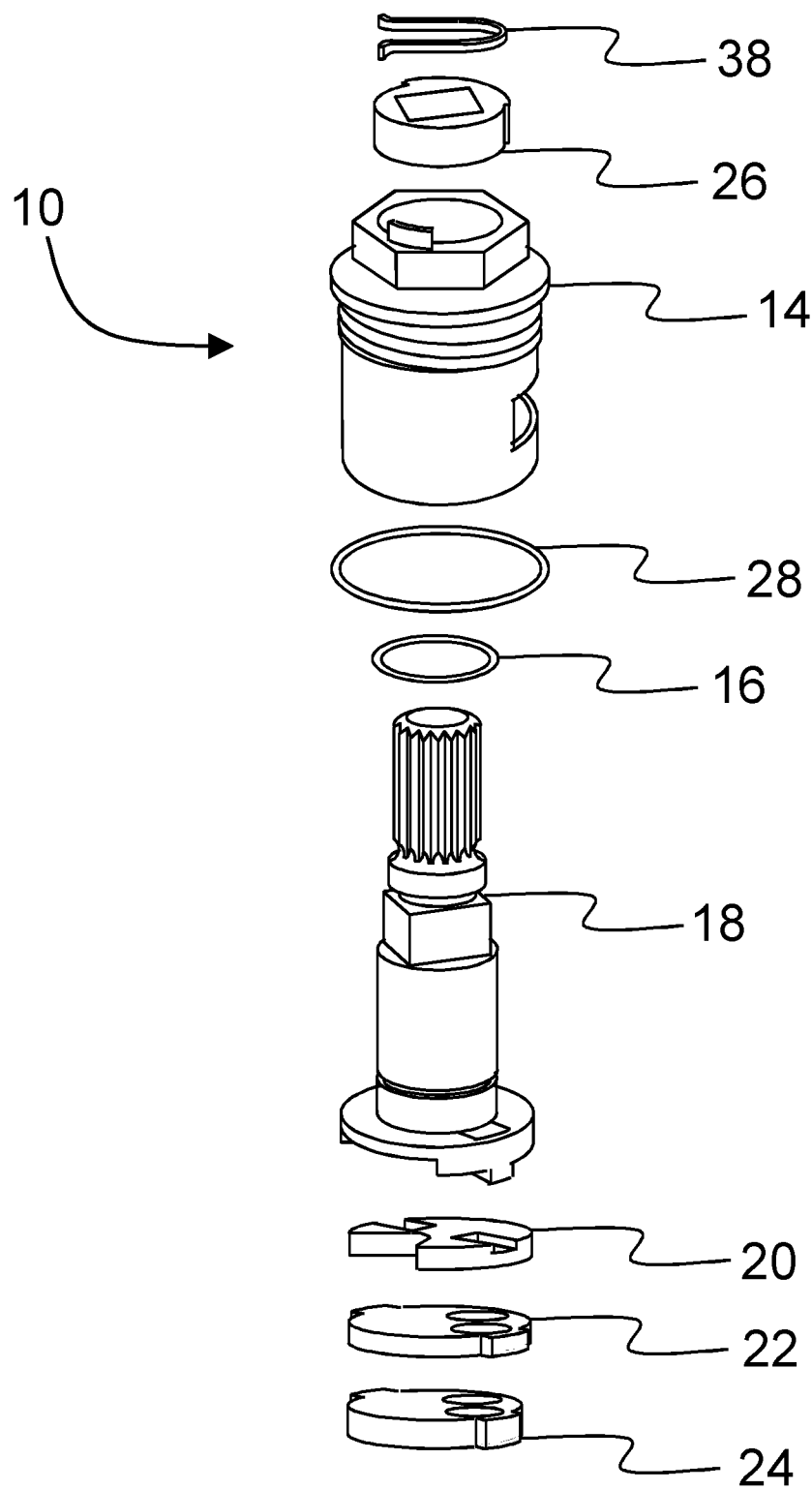
FIG. 2 is an exploded perspective view of the cartridge assembly of FIG. 1.
Figure 3:
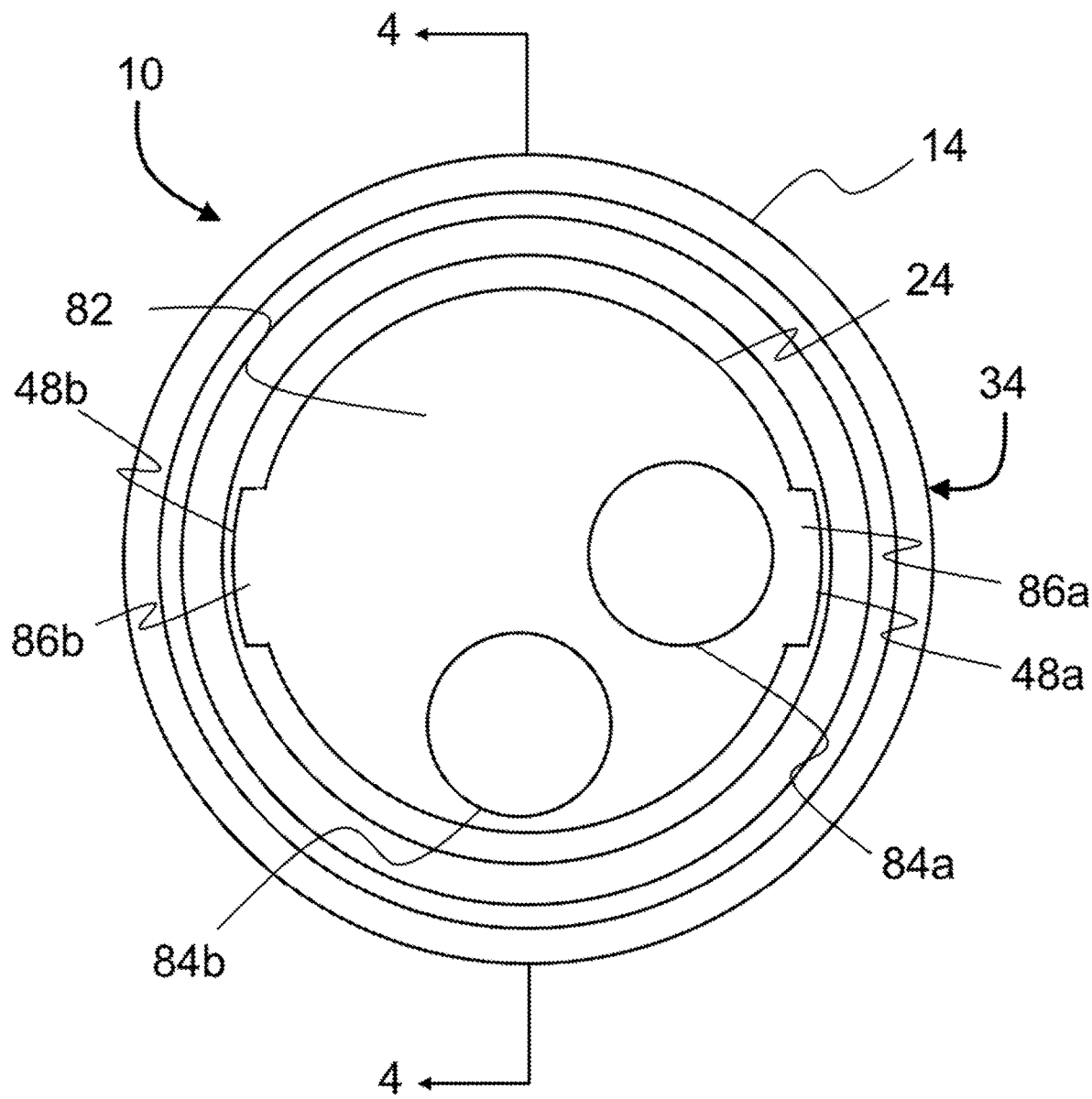
FIG. 3 is a bottom plan view of the cartridge assembly of FIG. 1.
Figure 4A:
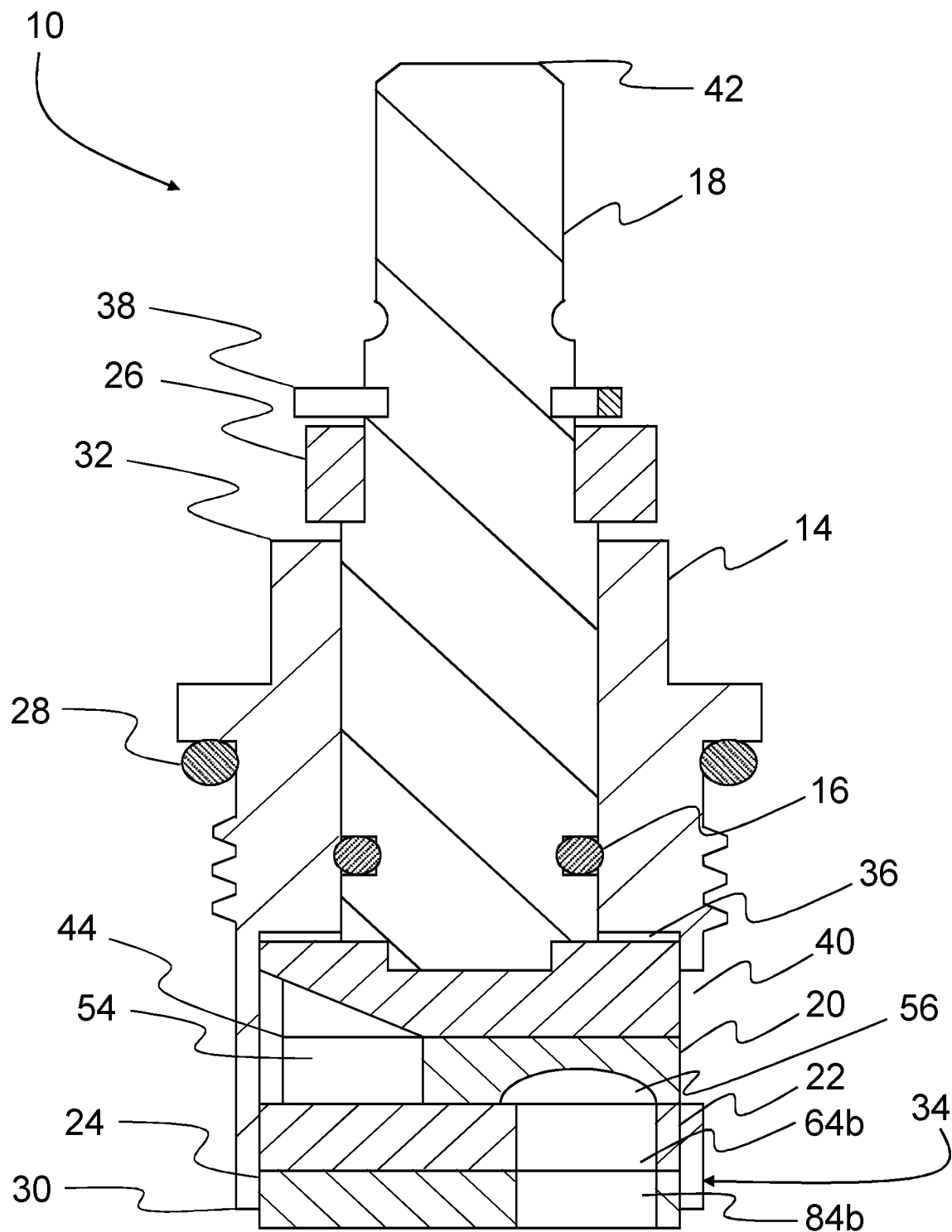
FIG. 4A is a cross-sectional view of the cartridge assembly of FIG. 3 along the line 4-4, rotated counterclockwise ninety degrees (90°)

An exemplary embodiment of a cartridge assembly 10 is shown in FIGS. 1-4A. In the illustrated embodiment, as shown in FIG. 1, the cartridge assembly 10 is installed in a valve body 12. In the illustrated embodiment, as shown in FIGS. 2 and 4A, the cartridge assembly 10 includes a cartridge shell 14, a stem 18, a stem seal 16, a stem collar 26, a retaining clip 38, a moveable disk 20, a fixed disk 22, a base seal 24, and a cartridge shell seal 28. Cartridge assemblies and valve bodies are well known in the art; therefore, only the relevant components of the cartridge assembly 10 and the valve body 12 will be described in greater detail.

Figure 4B:
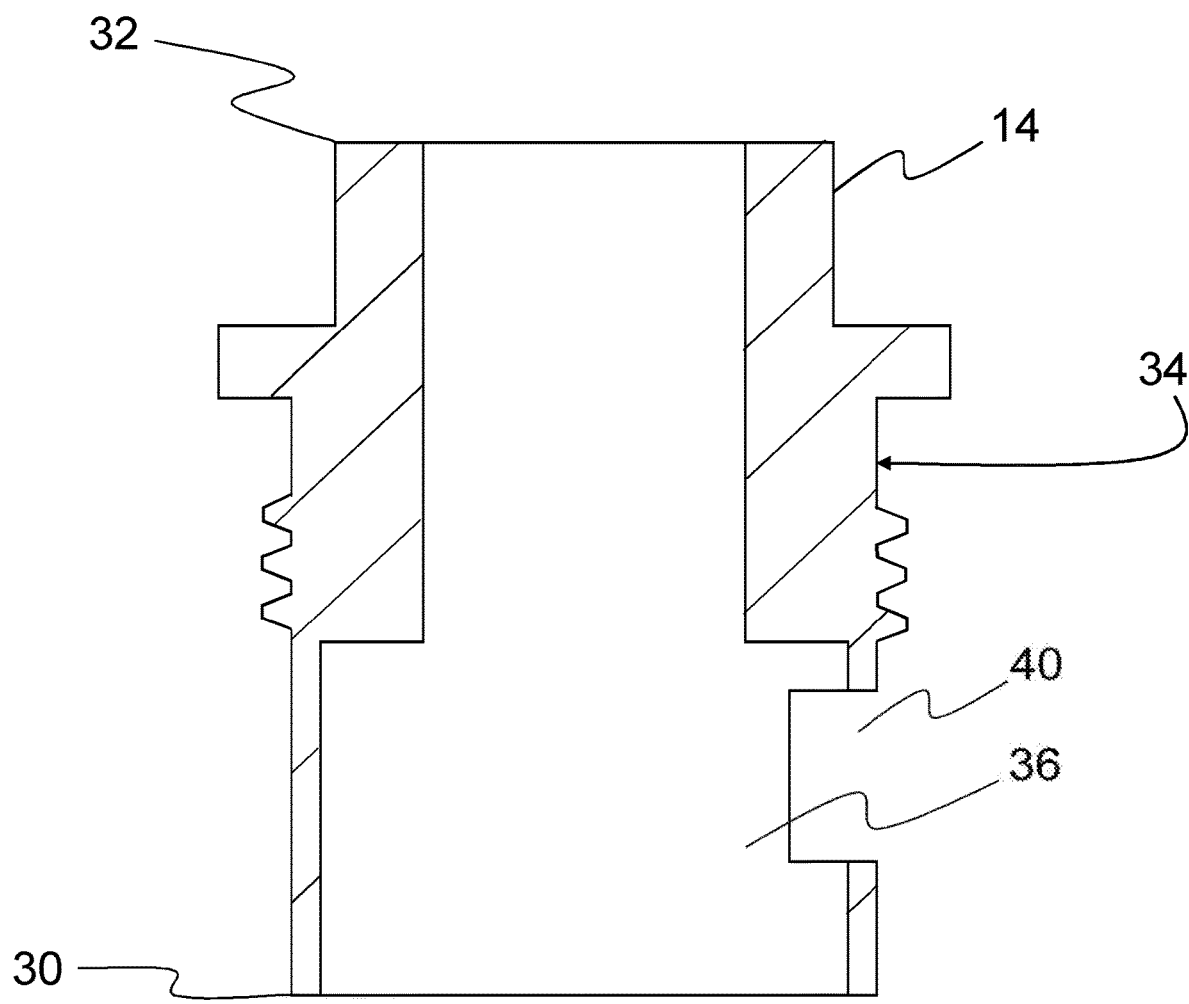
FIG. 4B is a cross-sectional view of the cartridge shell of FIG. 4A.
Figure 5A:
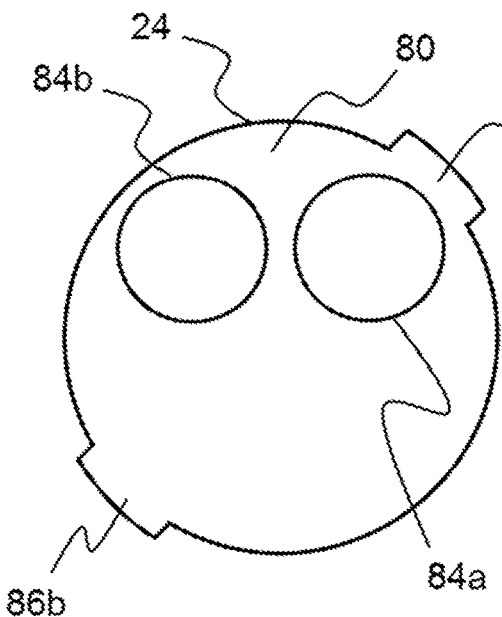
FIGS. 5A-5D are views of the base seal of FIG. 2
Figure 5B:
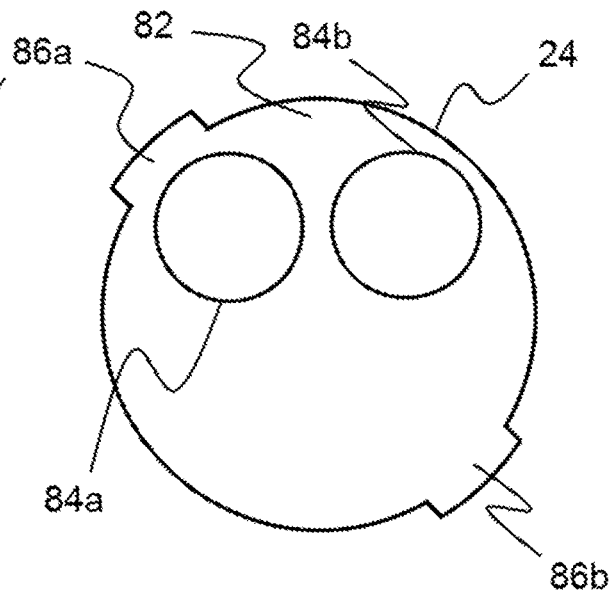
Figure 5C:
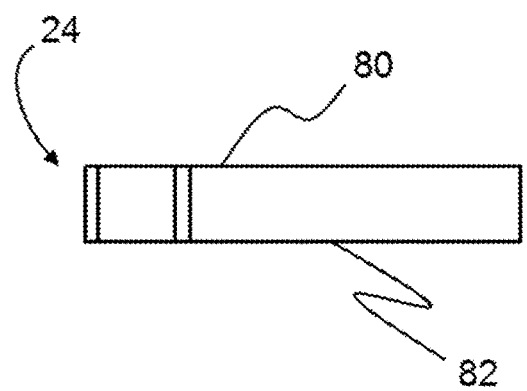
Figure 5D:
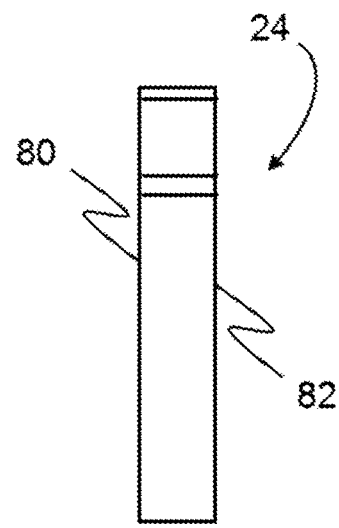

In the illustrated embodiment, as shown in FIG. 4A, the cartridge shell 14 includes a first end 30 and a second end 32. In the illustrated embodiment, as shown in FIG. 4B, the cartridge shell 14 includes an exterior 34 with a generally cylindrical shape. The cartridge shell 14 includes an interior 36 with a generally cylindrical shape. The cartridge shell 14 includes an opening 40 extending from the interior 36 through the exterior 34 between the first end 30 and the second end 32 of the cartridge shell 14. Additionally, in the illustrated embodiment, as shown in FIG. 3, the cartridge shell 14 includes two recesses 48a, 48b arranged one hundred eighty degrees (180°) apart on the inner periphery of the cartridge shell 14. The cartridge shell 14 can be formed of plastic, metal, or any other suitable material.

In the illustrated embodiment, as shown in FIG. 1, the valve body 12 includes a first end 11 and a second end 13. The valve body 12 includes an inlet tube 15. The inlet tube 15 is connected to the second end 13 of the valve body 12. The valve body 12 includes an outlet tube 17. The outlet tube 17 is connected to the second end 13 of the valve body 12. The valve body 12 includes an exterior 46 with a generally cylindrical shape. The valve body 12 includes an interior (not shown) with a generally cylindrical shape. The interior of the valve body 12 generally corresponds to the exterior 34 of the cartridge shell 14. The valve body 12 can be formed of plastic, metal, or any other suitable material.

In an exemplary embodiment, as illustrated in FIGS. 5A-5D, the base seal 24 includes a top side 80 and a bottom side 82. The base seal 24 includes a first opening 84a extending from the top side 80 through the bottom side 82. The base seal 24 includes a second opening 84b extending from the top side 80 through the bottom side 82. Additionally, in the illustrated embodiment, the base seal 24 includes two lugs 86a, 86b arranged one hundred eighty degrees (180°) apart on the periphery of the base seal 24 for engagement with the recesses 48a, 48b on the inner periphery of the cartridge shell 14, as shown in FIG. 3. The base seal 24 can be formed of neoprene or any other suitable material.

Figure 6A:
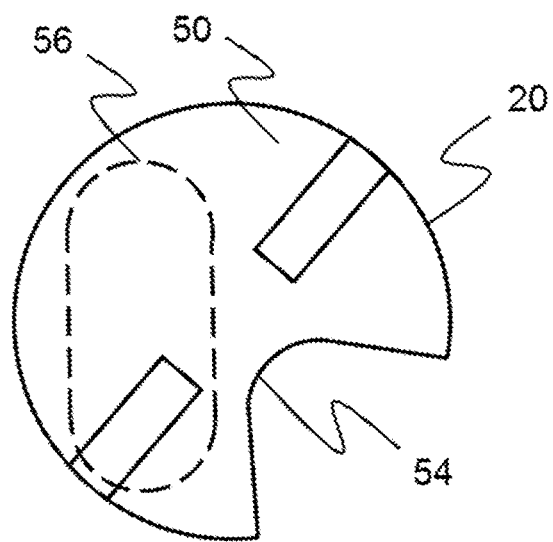
FIGS. 6A-6D are views of the moveable disk of FIG. 2
Figure 6B:
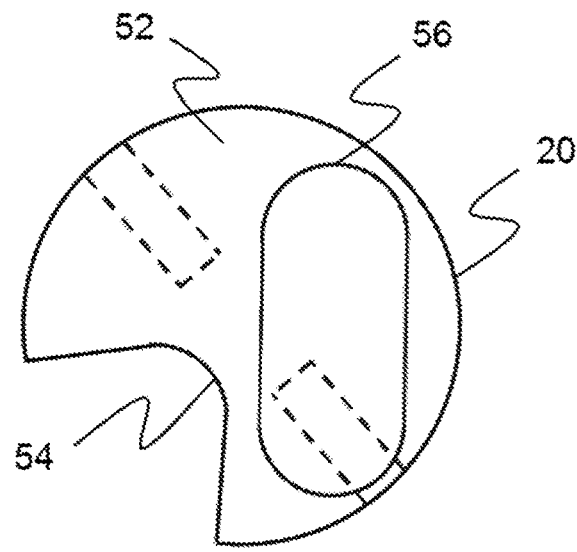
Figure 6C:
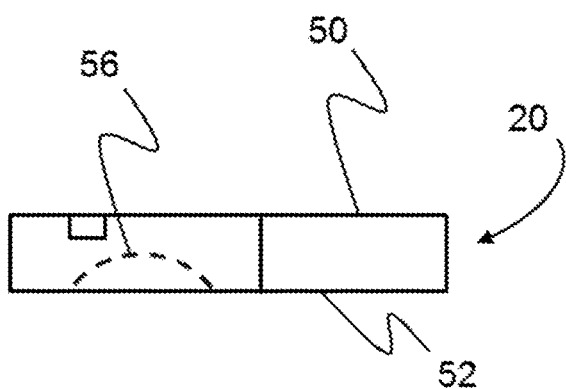
Figure 6D:
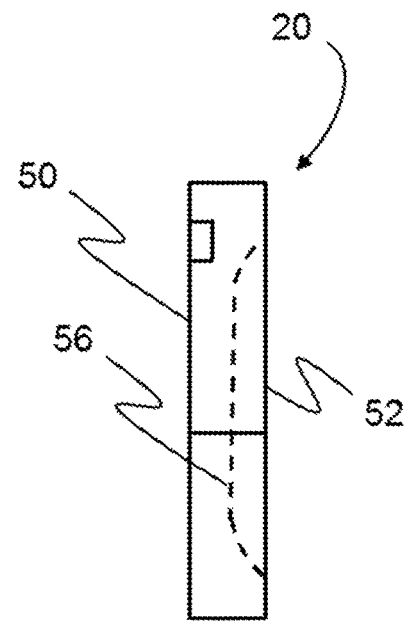
Figure 7A:
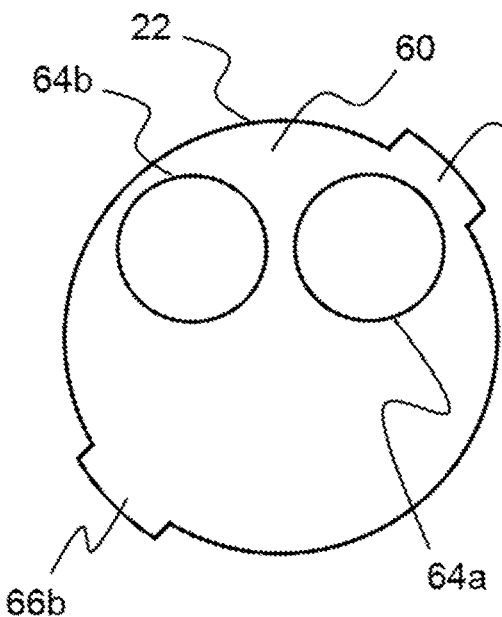
FIGS. 7A-7D are views of the fixed disk of FIG. 2
Figure 7B:
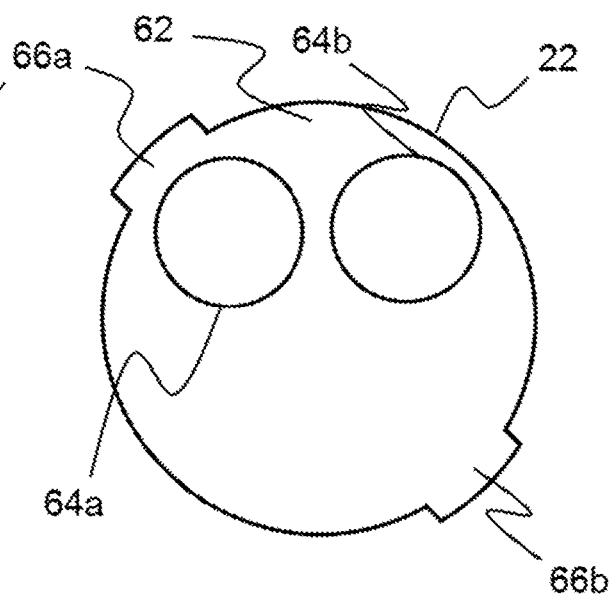
Figure 7C:
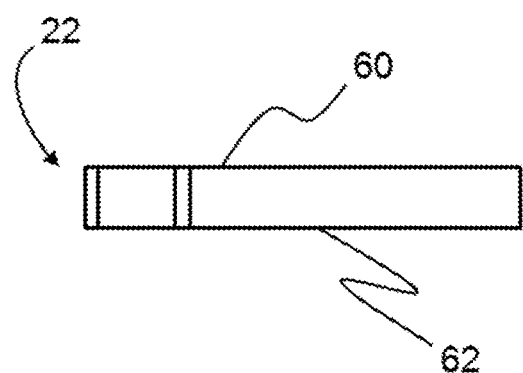
Figure 7D:
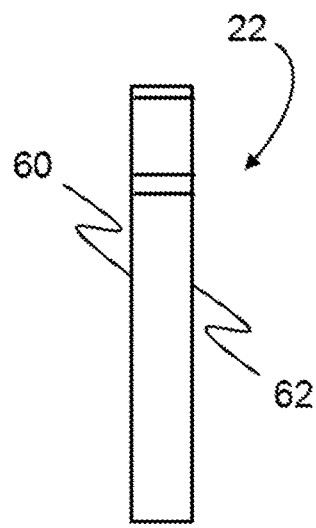

In an exemplary embodiment, as illustrated in FIGS. 6A-6D, the moveable disk 20 includes a top side 50 and a bottom side 52. The moveable disk 20 includes a cavity 56 on the bottom side 52. The moveable disk 20 also includes one opening 54 extending from the top side 50 through the bottom side 52. In the illustrated embodiment, the opening 54 is configured such that the moveable disk 20 presents an open-mouth shape when viewed in plan view, as shown in FIGS. 6A and 6B. The moveable disk 20 can be formed of ceramic material or any other suitable material.

In an exemplary embodiment, as illustrated in FIGS. 7A-7D, the fixed disk 22 includes a top side 60 and a bottom side 62. The fixed disk 22 includes a first opening 64a extending from the top side 60 through the bottom side 62. The fixed disk 22 includes a second opening 64b extending from the top side 60 through the bottom side 62. Additionally, the fixed disk 22 includes two lugs 66a, 66b arranged one hundred eighty degrees (180°) apart on the periphery of the fixed disk 22 for engagement with the recesses 48a, 48b on the inner periphery of the cartridge shell 14. The fixed disk 22 can be formed of ceramic material or any other suitable material.

In the illustrated embodiment, as shown in FIG. 4A, the stem 18 includes a first end 42 and a second end 44. A handle (not shown) is connected to the first end 42 of the stem 18.

The second end 44 of the stem 18 is operably connected to the top side 50 of the moveable disk 20. The bottom side 52 of the moveable disk 20 abuts the top side 60 of the fixed disk 22. The bottom side 62 of the fixed disk 22 abuts the top side 80 of the base seal 24. The first opening 84a in the base seal 24 is aligned with the first opening 64a in the fixed disk 22. In the illustrated embodiment, the second opening 84b in the base seal 24 is aligned with the second opening 64b in the fixed disk 22, as shown in FIG. 4A.

Figure 8A:
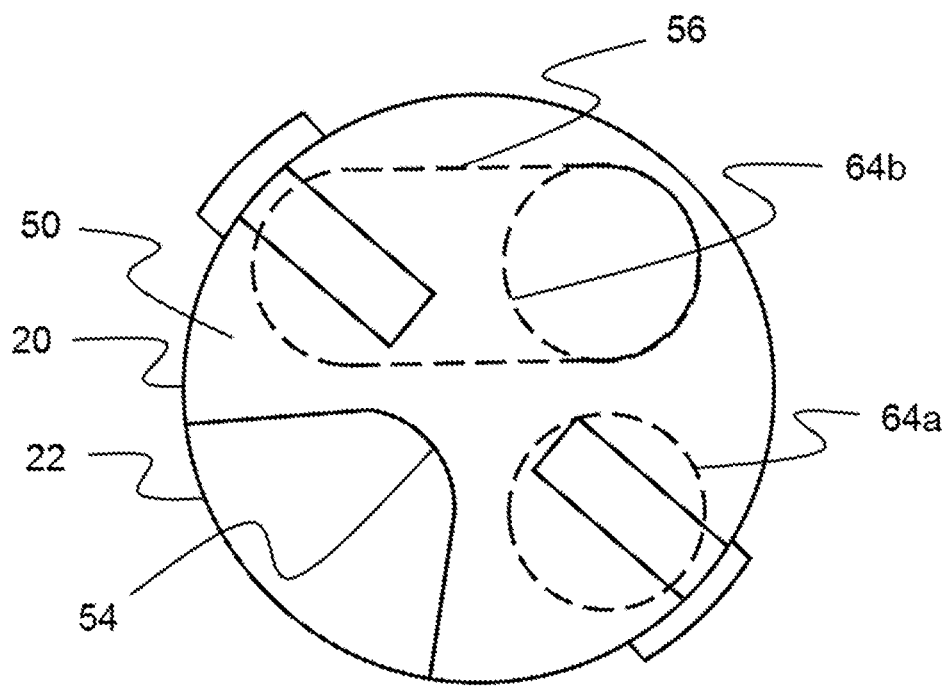
FIGS. 8A-8C are top plan views of the moveable disk of FIG. 2 in operable relation to the fixed disk of FIG. 2

In an exemplary embodiment, a flow source is connected to the inlet tube 15 of the valve body 12. The inlet tube 15 abuts the first opening 84a in the base seal 24. The outlet tube 17 abuts the second opening 84b in the base seal 24. Rotation of the handle causes rotation of the stem 18. Rotation of the stem 18 causes rotation of the moveable disk 20 relative to the fixed disk 22. In an exemplary embodiment, as illustrated in FIG. 8A, when the handle and the stem 18 are in a completely-closed position, the opening 54 in the moveable disk 20 is not aligned with the opening 64a in the fixed disk 22 nor does the opening 54 in the moveable disk 20 overlap any portion of the opening 64a in the fixed disk 22. Further, in the completely-closed position, the cavity 56 in the moveable disk 20 is aligned with the second opening 64b in the fixed disk 22, but the cavity 56 is not aligned with the first opening 64a in the fixed disk 22 nor does the cavity 56 overlap any portion of the first opening 64a in the fixed disk 22.

Figure 8B:
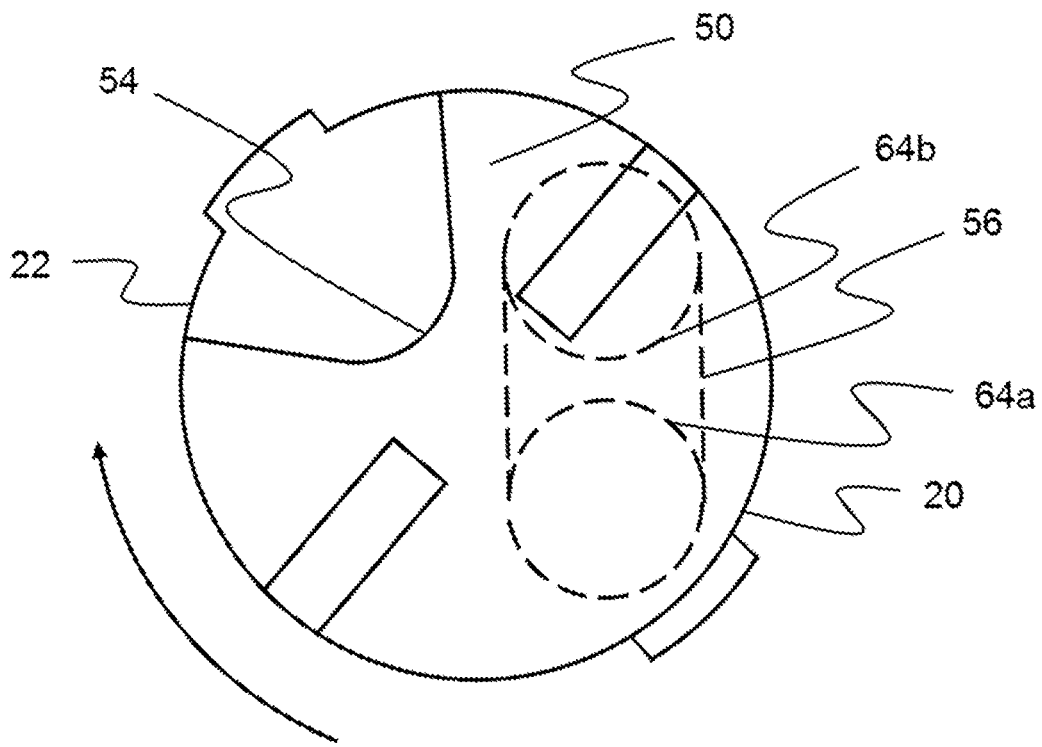

In the completely-closed position, the handle, stem 18, and moveable disk 20 are at zero degrees (0°) of rotation. As the handle and the stem 18 are rotated in a clockwise direction from the completely-closed position, the cavity 56 in the moveable disk 20 begins to overlap the first opening 64a in the fixed disk 22. As the handle and the stem 18 are further rotated, the amount of overlap increases. In an exemplary embodiment, as illustrated in FIG. 8B, when the handle and the stem 18 are rotated to a completely-open position at a handle and stem 18 rotation of approximately ninety degrees (90°) in the clockwise direction, the cavity 56 in the moveable disk 20 is aligned with both of the openings 64a, 64b in the fixed disk 22.

Figure 8C:
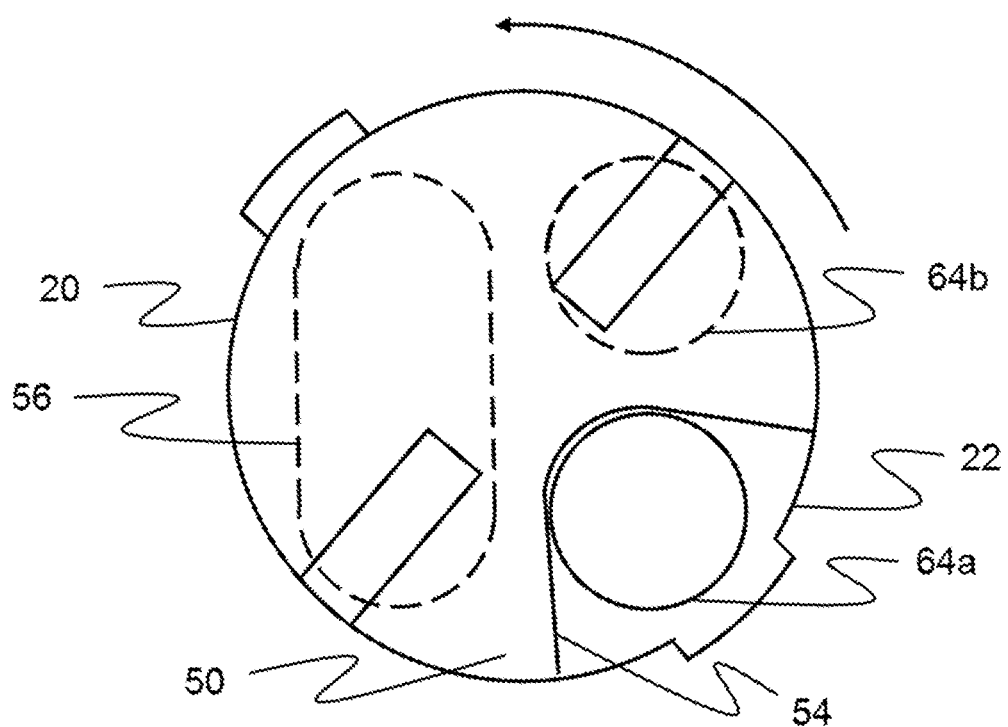

In an exemplary embodiment, as the handle and the stem 18 are rotated in a counterclockwise direction from the completely-closed position, the opening 54 in the moveable disk 20 begins to overlap the first opening 64a in the fixed disk 22. As the handle and the stem 18 are further rotated, the amount of overlap increases. In an exemplary embodiment, as illustrated in FIG. 8C, when the handle and the stem 18 are rotated to a completely-open position at a handle and stem 18 rotation of approximately ninety degrees (90°) in the counterclockwise direction, the opening 54 in the moveable disk 20 is aligned with the first opening 64a in the fixed disk 22.

In an exemplary embodiment, the moveable disk 20 and the fixed disk 22 are configured in the cartridge assembly 10 to create two (2) zones of control. Under the first zone of control, flow from a flow source enters the inlet tube 15 and is regulated through a range of counterclockwise rotation of ninety degrees (90°) of the stem 18 from the completely-closed position to a completely-open position. The first zone of control regulates the flow through the first end of the cartridge shell 30, through the first opening 84a in the base seal 24, through the first opening 64a in the fixed disk 22, through the opening 54 in the moveable disk 20, and through the opening 40 in the cartridge shell 14. Under the second zone of control, the flow enters the inlet tube 15 and is regulated through a range of clockwise rotation of ninety degrees (90°) of the stem 18 from the completely-closed position to a completely-open position. The second zone of control regulates the flow through the first end of the cartridge shell 30, through the first opening 84a in the base seal 24, through the first opening 64a in the fixed disk 22, into the cavity 56 in the moveable disk 20 where the flow is diverted through the second opening 64b in the fixed disk 22, through the second opening 84b in the base seal 24, through the first end of the cartridge shell 30, and through the outlet tube 17.

One of ordinary skill in the art will now appreciate that the cartridge assembly permits flow from a flow source to be regulated by the cartridge assembly to flow along a first flow path or along a second flow path. Flow along the first flow path enters the cartridge shell through a first end and exits through at least one opening in the cartridge shell. Flow along the second flow path enters the cartridge shell through the first end and exits through the first end. Although the cartridge assembly has been shown and described with reference to particular embodiments, equivalent alterations and modifications are within the scope of the cartridge assembly. The cartridge assembly is limited only by the scope of the following claims in light of their full scope of equivalent alterations and modifications.

I claim:

1. A cartridge assembly for a faucet, the cartridge assembly comprising:
    a cartridge shell, the cartridge shell including a first end and a second end, the cartridge shell including an exterior, the cartridge shell including an interior, the cartridge shell including at least one opening extending from the interior through the exterior between the first end and the second end;
    a stem, the stem operable to be at least partially disposed within the cartridge shell;
    a fixed disk, the fixed disk operable to be disposed within the cartridge shell, the fixed disk including a top side and a bottom side, the fixed disk including a first opening extending from the top side through the bottom side, the first opening located not concentric with the fixed disk, the fixed disk including a second opening extending from the too side through the bottom side, the second opening located not concentric with the fixed disk; and
    a moveable disk, the moveable disk operable to be disposed within the cartridge shell, the moveable disk including a top side and a bottom side, the moveable disk including an opening extending from the top side through the bottom side, the opening located not concentric with the moveable disk, the moveable disk including a cavity on the bottom side, the cavity located not concentric with the moveable disk;
    wherein the bottom side of the moveable disk abuts the top side of the fixed disk;
    wherein flow is regulated by the cartridge assembly to flow along a first flow path or along a second flow path, flow along the first flow path enters the cartridge shell through the first end and exits the cartridge shell through at least one opening in the cartridge shell, flow along the second flow path enters the cartridge shell through the first end and exists the cartridge shell through the first end;
    wherein the stem is operably connected to the moveable disk so that movement of the stem causes movement of the moveable disk relative to the fixed disk;
    wherein the moveable disk and the fixed disk are configured such that movement of the moveable disk relative to the fixed disk creates zones of control;

wherein a first zone of control regulates flow from a flow source along the first flow path through a range of movement of the stem from a completely-closed position, which does not permit flow from the flow source to exit through any openings in the cartridge shell, to a completely-open position, which permits a maximum flow from the flow source to flow through the first opening in the fixed disk and to flow through the opening in the moveable disk and to exit through at least one opening in the cartridge shell;

wherein a second zone of control regulates flow from the flow source along the second flow path through a range of movement of the stem from a completely-closed position, which does not permit flow from the flow source to exit through the first end of the cartridge shell, to a completely-open position, which permits a maximum flow from the flow source to flow through the first opening in the fixed disk and to enter the cavity in the moveable disk and to flow through the second opening in the fixed disk and to exit through the first end of the cartridge shell.

2. The cartridge assembly of claim 1, wherein movement of the moveable disk relative to the fixed disk is rotational.

\* \* \* \* \*